(12) United States Patent
Heide et al.

(10) Patent No.: US 8,835,575 B2
(45) Date of Patent: Sep. 16, 2014

(54) METHOD FOR THE PRODUCTION OF WATER-ABSORBING POLYMER PARTICLES

(75) Inventors: Wilfried Heide, Freinsheim (DE); Claus Hechler, Ludwigshafen (DE); Marc Gerardus Nicolas Grimmon, Tm Woensdrecht (NL); Filip Mees, Lake Jackson, TX (US); Karl J. Possemiers, Gravenwezel (BE)

(73) Assignee: BASF SE, Ludwigshafen (DE)

( * ) Notice: Subject to any disclaimer, the term of this patent is extended or adjusted under 35 U.S.C. 154(b) by 597 days.

(21) Appl. No.: 12/863,394

(22) PCT Filed: Jan. 26, 2009

(86) PCT No.: PCT/EP2009/050835
§ 371 (c)(1),
(2), (4) Date: Jul. 16, 2010

(87) PCT Pub. No.: WO2009/095370
PCT Pub. Date: Aug. 6, 2009

(65) Prior Publication Data
US 2010/0298513 A1    Nov. 25, 2010

(30) Foreign Application Priority Data

Jan. 29, 2008  (EP) .................................... 08101023

(51) Int. Cl.
| | |
|---|---|
| *C08F 2/00* | (2006.01) |
| *C08F 2/16* | (2006.01) |
| *C08F 2/18* | (2006.01) |
| *C08F 20/06* | (2006.01) |
| *C08F 120/06* | (2006.01) |
| *C08F 220/06* | (2006.01) |

(52) U.S. Cl.
CPC .................................... *C08F 220/06* (2013.01)
USPC ........................... 526/59; 526/228; 526/317.1

(58) Field of Classification Search
USPC ......................................... 526/59, 228, 317.1
See application file for complete search history.

(56) References Cited

U.S. PATENT DOCUMENTS 6,241,928 B1 *   6/2001  Hatsuda et al. ................ 264/216
7,960,485 B2 *   6/2011  Funk et al. ....................... 526/77
2008/0214750 A1   9/2008  Stueven et al.

FOREIGN PATENT DOCUMENTS

| WO | WO-03/051940 A1 | 6/2003 |
| WO | WO-2006/053731 A1 | 5/2006 |
| WO | WO 2006053731 A1 * | 5/2006 |

OTHER PUBLICATIONS

Buchholz, Fredric L., et al.. *Modern Superabsorbent Polymer Technology*, "Solution Polymerization: Unit Operations and Their Effect on Product Quality." New York: John Wiley & Sons, Inc., 1998, pp. 71-103.

* cited by examiner

*Primary Examiner* — Karuna P Reddy
(74) *Attorney, Agent, or Firm* — Marshall, Gerstein & Borun LLP

(57) ABSTRACT

A process for continuously producing water-absorbing polymer particles, wherein the monomer stems from at least two different sources and the monomer from one source differs from the monomer from at least one other source in the content of at least one secondary component.

13 Claims, No Drawings

METHOD FOR THE PRODUCTION OF WATER-ABSORBING POLYMER PARTICLES

CROSS-REFERENCE TO RELATED APPLICATIONS

This is the U.S. national phase of International application No. PCT/EP2009/050835, filed Jan. 26, 2009, which claims the benefit of European patent application No. 08101023.3, filed Jan. 29, 2008.

The present invention relates to a process for continuously producing water-absorbing polymer particles, wherein the monomer stems from at least two different sources.

The production of water-absorbing polymer particles is described in the monograph "Modern Superabsorbent Polymer Technology", F. L. Buchholz and A. T. Graham, Wiley-VCH, 1998, pages 71 to 103.

Water-absorbing polymers are used to produce diapers, tampons, sanitary napkins and other hygiene articles, but also as water-retaining agents in market gardening.

WO 2003/051940 A1 discloses a process for producing water-absorbing polymer particles using acrylic acid comprising from 0.001 to 0.016% by weight of hydroquinone monomethyl ether.

WO 2006/053731 A1 teaches the use of acrylic acid comprising a little allyl acrylate and/or allyl alcohol in the production of water-absorbing polymer particles.

In polymerizations, even small amounts of secondary components in monomers have a considerable influence on the properties of the end product. The secondary components are therefore typically specified in the supply conditions. The use of monomers from different suppliers with a different by-product spectrum is therefore not an option. On the other hand, it can be advantageous to have more than one supplier.

It was an object of the present invention to provide an improved, especially reliable, process for producing water-absorbing polymer particles.

The object was achieved by a process for producing water-absorbing polymer particles by polymerizing an aqueous monomer solution or suspension comprising a) at least one ethylenically unsaturated monomer which bears acid groups and may be at least partly neutralized,
b) at least one crosslinker,
c) at least one initiator,
d) optionally one or more ethylenically and/or allylically unsaturated monomers copolymerizable with the monomers specified under a) and
e) optionally one or more water-soluble polymers,
wherein at least one feedstock, preferably the monomer a); stems from at least two sources and the feedstock from one source differs from the feedstock from at least one other source in the content of at least one secondary component.

Different sources in the context of this invention may for example, be different suppliers. However, it is also possible that the monomers are purified in a different way by one supplier, for example by distillation and crystallization, and are released as different qualities.

Feedstocks in the context of this invention are, for example, the monomer a), the crosslinker b), the initiator c), the monomer d) and/or the polymer e). Feedstocks in the context of this invention are, though, also the bases used for at least partial neutralization of the monomer a), especially sodium hydroxide solution.

In a continuous preparation of water-absorbing polymer particles in the context of this invention, the source of at least one feedstock is changed during running operation, i.e. the source is switched or a feedstock from another source is additionally metered in. The shutdown and new adjustment of the process parameters which has been customary to date is no longer required.

The secondary components may be known secondary components of acrylic acid, such as acetic acid, formic acid, propionic acid, 2-furfural, 3-furfural, allyl acrylate, benzaldehyde, maleic anhydride, maleic acid, protoanemonin, acrolein, formaldehyde, benzoic acid, or assistants used in the preparation of acrylic acid and degradation products thereof. However, there may also be unknown by-products which become noticeable through a change in the onset behavior in the polymerization.

The present invention is based on the finding that it is possible through preliminary tests to determine the influence of the secondary components on the polymerization and to compensate for this influence by adjusting the amount of crosslinker b) and/or the amount of initiator c).

A preferred lead component for the content of secondary components is allyl acrylate. Allyl acrylate is depleted differently in distillation and crystallization and is therefore an indication for the pretreatment of the acrylic acid used as the monomer a).

The difference in the content of the secondary component between the monomers a) of the different sources is preferably at least 0.002% by weight, more preferably at least 0.0035% by weight, most preferably at least 0.005% by weight, based in each case on the monomer a).

The allowance for greater differences enables supply via more sources and hence increases the reliability of supply of monomer a).

In the continuous polymerization process, the content of the secondary component changes over time in the case of a switch of the source. The change with time in the content of the secondary component by at least 0.002% by weight is preferably less than 24 hours, more preferably less than 12 hours, most preferably less than 6 hours.

The allowance for relatively rapid changes with time in the content of the secondary component enables the use of smaller storage tanks for monomer a).

This is important particularly when monomer a) stabilized only to a low degree, for example monomer a) stabilized with less than 0.016% by weight of polymerization inhibitor, such as hydroquinone monomethyl ether, is stored.

However, it is also possible to obtain more highly stabilized monomers a) via the sources and to lower the content of polymerization inhibitors, for example by distillation, i.e. before the polymerization and if appropriate before the neutralization.

In the case of the above at least partial removal of polymerization inhibitors, it is advantageous to intermediately store the monomer a) with a low degree of stabilization in a buffer vessel. This allows this process stage to be decoupled at least partly from the polymerization.

For safety reasons, the buffer vessel should, though, not be selected with too great a size, i.e. the residence time of the monomer a) in the buffer vessel is preferably less than 24 hours, more preferably less than 12 hours, most preferably less than 6 hours.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water. Ideally, the monomers a) are miscible with water in any ratio.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

Further suitable monomers a) are, for example, ethylenically unsaturated sulfonic acids such as styrenesulfonic acid and 2-acrylamido-2-methylpropanesulfonic acid (AMPS).

The proportion of acrylic acid and/or salts thereof in the total amount of monomers a) is preferably at least 50 mol %, more preferably at least 90 mol %, most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol refers to compounds of the following formula

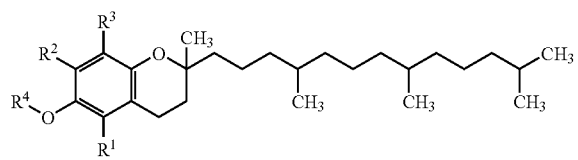

where $R^1$, is hydrogen or methyl, $R^2$ is hydrogen or methyl, $R^3$ is hydrogen or methyl and $R^4$ is hydrogen or an acyl radical having from 1 to 20 carbon atoms.

Preferred $R^4$ radicals are acetyl, ascorbyl, succinyl, nicotinyl and other physiologically tolerable carboxylic acids. The carboxylic acids may be mono-, di- or tricarboxylic acids.

Preference is given to alpha-tocopherol where $R^1=R^2=R^3=$methyl, especially racemic alpha-tocopherol. $R^1$ is more preferably hydrogen or acetyl. Especially preferred is RRR-alpha-tocopherol.

The monomer solution comprises preferably not more than 130 ppm by weight, more preferably not more than 70 ppm by weight, preferably not less than 10 ppm by weight, more preferably not less than 30 ppm by weight and especially about 50 ppm by weight of hydroquinone monoether, based in each case on acrylic acid, with acrylic acid salts being counted as acrylic acid. For example, the monomer solution can be prepared using acrylic acid having an appropriate hydroquinone monoether content.

Crosslinkers b) are preferably compounds having at least two polymerizable groups which can be polymerized by a free-radical mechanism into the polymer network. Suitable crosslinkers b) are, for example, ethylene glycol dimethacrylate, diethylene glycol diacrylate, polyethylene glycol diacrylate, ally methacrylate, trimethylolpropane triacrylate, triallylamine, tetraallylammonium chloride, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2. Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 100 and 1000, for example polyethylene glycol-400 diacrylate.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of at least 40-tuply ethoxylated glycerol, of at least 40-tuply ethoxylated trimethylolethane or of at least 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The amount of crosslinker b) is preferably from 0.05 to 1.5% by weight, more preferably from 0.1 to 1% by weight, most preferably from 0.3 to 0.6% by weight, based in each case on monomer a).

The initiators c) used may be all compounds which disintegrate into free radicals under the polymerization conditions, for example peroxides, hydroperoxides, hydrogen peroxide, persulfates, azo compounds and the so-called redox initiators. Preference is given to the use of water-soluble initiators. In some cases, it is advantageous to use mixtures of different initiators, for example mixtures of hydrogen peroxide and sodium or potassium peroxodisulfate. Mixtures of hydrogen peroxide and sodium peroxodisulfate can be used in any proportion.

Examples of ethylenically unsaturated monomers d) which are copolymerizable with the ethylenically unsaturated, acid-bearing monomers a) are acrylamide, methacrylamide, crotonamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers e) include polyvinyl alcohol, polyvinylpyrrolidone, starch, starch derivatives, polyglycols or polyacrylic acids, preferably polyvinyl alcohol and starch.

For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

The preparation of a suitable polymer and also further suitable hydrophilic ethylenically unsaturated monomers a) are described in DE 199 41 423 A1, EP 686 650 A1, WO 2001/45758 A1 and WO 2003/104300 A1.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/38402 A1. The polymerization on the belt is described, for example, in DE 38 25 366 A1 and U.S. Pat. No. 6,241,928. Polymerization in a belt reactor forms a polymer gel which has to be comminuted in a further process step, for example in a meat grinder, extruder or kneader.

The acid groups of the resulting hydrogels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the hydrogel stage. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the hydrogel stage. When the hydrogel is neutralized at least partly after the polymerization, the hydrogel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The hydrogel is then preferably dried with a belt dryer until the residual moisture content is preferably below 15% by weight, more preferably below 10% by weight and especially below 8% by weight the water content being determined by the EDANA (European Disposables and Nonwovens Association) recommended test method No. WSP 230.2-05 "Moisture content". If desired, however, drying can also be carried out using a fluidized bed dryer or a heated plowshare mixer. In order to obtain particularly white products, it is advantageous to dry this gel while ensuring rapid removal of the evaporating water. To this end, the dryer temperature must be optimized, the air feed and removal has to be conducted in a controlled manner, and sufficient venting must be ensured in each case. The higher the solids content of the gel, the simpler the drying, by its nature, and the whiter the product. The solids content of the gel before the drying is therefore preferably between 25% and 80% by weight. It is particularly advantageous to vent the dryer with nitrogen or another non-oxidizing inert gas. If desired, however, it is also possible simply just to lower the partial pressure of the oxygen during the drying in order to prevent oxidative yellowing processes.

Thereafter, the dried hydrogel is ground and classified, and the apparatus typically used for grinding may be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm, very particularly from 300 to 500 µm. The mean particle size of the product fraction may be determined by means of the EDANA (European Disposables and Nonwovens Association) recommended test method No. WSP 220.2-05 "Particle size distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of preferably at least 150 µm, more preferably at least 200 µm, most preferably at least 250 µm, is preferably at least 90% by weight, more preferably at least 95% by weight, most preferably at least 98% by weight.

The proportion of particles with a particle size of preferably at most 850 µm, more preferably at most 700 µm, most preferably at most 600 µm, is preferably at least 90% by weight, more preferably at least 95% by weight, most preferably at least 98% by weight.

To further improve the properties, the polymer particles may be postcrosslinked. Suitable postcrosslinkers are compounds which comprise groups which can form covalent bonds with at least two carboxylate groups of the polymer gel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1, 2-oxazolidone and its derivatives, such as 2-hydroxyethyl-2-oxazolidone, in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 837A1, bicyclic amide acetals in DE 103 34 584 A1, oxetanes and cyclic ureas in EP 1 199 327 A2 and morpholine-2,3-dione and its derivatives in WO 2003/31482 A1.

In addition, it is also possible to use postcrosslinkers which comprise additional polymerizable ethylenically unsaturated groups, as described in DE 37 13 601 A1.

The amount of postcrosslinker is preferably from 0.001 to 2% by weight, more preferably from 0.02 to 1% by weight, most preferably from 0.05 to 0.2% by weight, based in each case on the polymer.

In a preferred embodiment of the present invention, polyvalent cations are applied to the particle surface in addition to the postcrosslinkers before, during or after the postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are, for example, chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred. Apart from metal salts, it is also possible to use polyamines as polyvalent cations.

The amount of polyvalent cation used is, for example, from 0.001 to 1.5% by weight, preferably from 0.005 to 1% by weight, more preferably from 0.02 to 0.8% by weight, based in each case on the polymer.

The postcrosslinking is typically performed in such a way that a solution of the postcrosslinker is sprayed onto the hydrogel or the dry polymer particles. After the spraying, the polymer particles coated with the postcrosslinker are dried thermally, and the postcrosslinking reaction can take place either before or during the drying.

The spraying of a solution of the postcrosslinker is preferably performed in mixers with moving mixing tools, such as screw mixers, disk mixers, plowshare mixers and paddle mixers. Particular preference is given to horizontal mixers such as plowshare mixers and paddle mixers, very particular preference to vertical mixers. Suitable mixers are, for example, Lödige mixers, Bepex mixers, Nauta mixers, Processall mixers and Schugi mixers.

The postcrosslinkers are typically used as an aqueous solution. The addition of nonaqueous solvent can be used to adjust the penetration depth of the postcrosslinker into the polymer particles.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a shelf dryer, a rotary tube oven or a heatable screw. It is particularly advantageous to mix and dry in a fluidized bed dryer.

Preferred drying temperatures are in the range from 100 to 250° C., preferably from 120 to 220° C., more preferably from 130 to 210° C., most preferably from 150 to 200° C. The preferred residence time at this temperature in the reaction mixer or dryer is preferably at least 10 minutes, more preferably at least 20 minutes, most preferably at least 30 minutes, and typically at most 60 minutes.

Subsequently, the postcrosslinked polymer can be classified again.

To further improve the properties, the postcrosslinked polymer particles can be coated or subsequently moistened. Suitable coatings for improving the acquisition behavior and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings against the undesired caking tendency of the polymer particles are, for example, fumed silica, such as Aerosil® 200, and surfactants, such as Span® 20.

The water-absorbing polymer particles obtainable by the process according to the invention have a water content of preferably less than 15% by weight, more preferably less than 10% by weight, most preferably less than 8% by weight, the water content being determined by means of the EDANA (European Disposables and Nonwovens Association) recommended test method No. WSP 230.2-05 "Moisture content".

The water-absorbing polymer particles obtainable by the process according to the invention have a centrifuge retention capacity (CRC) of typically at least 15 g/g, preferably at least 20 g/g, preferentially at least 22 g/g, more preferably at least 24 g/g, most preferably at least 26 g/g. The centrifuge retention capacity (CRC) of the water-absorbing polymer particles is typically less than 60 g/g. The centrifuge retention capacity (CRC) is determined by means of the EDANA (European Disposables and Nonwovens Association) recommended test method No. WSP 241.2-05 "Centrifuge retention capacity".

The water-absorbing polymer particles obtainable by the process according to the invention have an absorption under a pressure of 0.7 psi (4.83 kPa) of typically at least 15 g/g, preferably at least 20 g/g, preferentially at least 22 g/g, more preferably at least 24 g/g, most preferably at least 26 g/g. The absorption under a pressure of 0.7 psi (AUL0.7 psi) of the water-absorbing polymer particles is typically less than 50 g/g. The absorption under a pressure of 0.7 psi (AUL0.7 psi) is determined analogously to the EDANA (European Disposables and Nonwovens Association) recommended test method No. WSP 242.2-05 "Absorption under pressure", except that a pressure of 0.7 psi (4.83 kPa) instead of a pressure of 0.3 psi (2.07 kPa) is set.

EXAMPLE

By continuous mixing of water, 50% by weight sodium hydroxide solution and acrylic acid, a 38.8% by weight acrylic acid/sodium acrylate solution was prepared, such that the degree of neutralization was 71.3 mol %. The solids content of the monomer solution was 38.8% by weight. After the components had been mixed, the monomer solution was cooled continuously by a heat exchanger.

The polyethylenically unsaturated crosslinker used is polyethylene glycol-400 diacrylate. The amount used was 1.3 kg per t of monomer solution.

To initiate the free-radical polymerization, the following components were used: hydrogen peroxide (1.03 kg (0.25% strength by weight) per t of monomer solution), sodium peroxodisulfate (3.10 kg (15% strength by weight) per t of monomer solution) and ascorbic acid (1.05 kg (1% strength by weight) per t of monomer solution).

The throughput of the monomer solution was 20 t/h.

The individual components are metered continuously into a List Contikneter continuous kneader of capacity 6.3 m$^3$ (from List, Arisdorf, Switzerland) in the following amounts:

20 t/h of monomer solution
26 kg/h of polyethylene glycol-400 diacrylate
82.6 kg/h of hydrogen peroxide solution/sodium peroxodisulfate solution
21 kg/h of ascorbic acid solution Between the addition points for crosslinker and initiators, the monomer solution was inertized with nitrogen.

At the end of the reactor, 1000 kg/h of removed undersize with a particle size of less than 150 μm were additionally metered in.

At the feed, the reaction solution had a temperature of 23.5° C. The reactor was operated with a shaft speed of 38 rpm. The residence time of the reaction mixture in the reactor was 15 minutes.

After polymerization and gel comminution, the aqueous polymer gel was placed onto a belt dryer. The residence time on the dryer belt was approx. 37 minutes.

The dried hydrogel was ground and screened.

The acrylic acid used as monomer a) was purified by crystallization and the content of allyl acrylate was below the detection limit of 0.0001% by weight.

During the continuous production, acrylic acid purified by distillation was also used as monomer a). The distilled acrylic acid comprised approx. 0.008% by weight of allyl acrylate.

Both the crystallized and the distilled acrylic acid were metered into the neutralization via a common reservoir. The content of allyl acrylate in the acrylic acid in the reservoir was analyzed regularly. In the event of a rise in the content of allyl acrylate in the reservoir, the amount of was lowered, such that to a change in the content of allyl acrylate by 0.004% by weight corresponded to a change in the amount of crosslinker by 0.026 kg per t of monomer solution. As a result of this measure, the centrifuge retention capacity (CRC) of the water-absorbing polymer particles produced remained within the target range having a width of 2 g/g.

The invention claimed is:

1. A process for continuously producing water-absorbing polymer particles by polymerizing an aqueous monomer solution or suspension comprising
   a) at least one ethylenically unsaturated monomer which bears acid groups and may be at least partly neutralized,
   b) at least one crosslinker,
   c) at least one polymerization initiator,
   d) optionally one or more ethylenically and/or allylically unsaturated monomer copolymerizable with the monomer specified under a), and
   optionally one or more water-soluble polymer,
   wherein at least the monomer a) stems from at least two sources and the monomer a) from one source differs from the monomer a) from at least one other source in a content of at least one secondary component by at least 0.0035% by weight,
   and the at least one secondary component is selected from the group consisting of acetic acid, formic acid, propionic acid, 2-furfural, 3-furfural, allyl acrylate, benzaldehyde, maleic anhydride, maleic acid, protoanemonin, acrolein, formaldehyde, and benzoic acid.

2. The process according to claim 1, wherein the content of the at least one secondary component of monomer a) in the feed of the polymerization changes with time during the continuous production of the water-absorbing polymer particles.

3. The process according to claim 1, wherein the monomer a) is acrylic acid.

4. The process according to claim 1, wherein the secondary component is allyl acrylate.

5. The process according to claim 1, wherein the monomer a) comprises less than 0.016% by weight of a polymerization inhibitor.

6. The process according to claim 5, wherein the polymerization inhibitor is hydroquinone monomethyl ether.

7. The process according to claim 1, wherein the monomer a) is distilled before the polymerization and optionally before neutralization.

8. The process according to claim 7, wherein the monomer a) is stored intermediately in a buffer vessel before the polymerization and optionally before the neutralization.

9. The process according to claim 8, wherein a residence time of the monomer a) in the buffer vessel is less than 24 hours.

10. The process according to claim 1, wherein an amount of crosslinker b) is adjusted in a case of a change in concentration of a secondary component in the feed to the polymerization.

11. The process according to claim 1, wherein the amount of polymerization initiator c) is adjusted in a case of a change in concentration of a secondary component in the feed to the polymerization.

12. The process according to claim 1, wherein a polymer gel obtained by polymerization is dried, ground, classified, and optionally postcrosslinked.

13. The process according to claim 1, wherein the water-absorbing polymer particles have a centrifuge retention capacity of at least 15 g/g.

\* \* \* \* \*